US00RE38978E

(19) United States
(12) Reissued Patent
Nakajima et al.

(10) Patent Number: US RE38,978 E
(45) Date of Reissued Patent: Feb. 14, 2006

(54) TONER TRANSPORTING METHOD AND MECHANISM EMPLOYING A BELT CONVEYOR

(75) Inventors: Shigeki Nakajima, Tokyo (JP); Atsushi Kobayashi, Tokyo (JP)

(73) Assignee: Oki Data Corporation, Tokyo (JP)

(21) Appl. No.: 09/956,214

(22) Filed: Sep. 19, 2001

Related U.S. Patent Documents

Reissue of:
(64) Patent No.: 5,956,556
Issued: Sep. 21, 1999
Appl. No.: 09/094,938
Filed: Jun. 15, 1998

(30) Foreign Application Priority Data

Jun. 19, 1997 (JP) ..... 9-162759
Feb. 9, 1998 (JP) ..... 10-027601

(51) Int. Cl.
*G03G 21/10* (2006.01)

(52) U.S. Cl. ..... 399/359; 399/358
(58) Field of Classification Search ..... 399/343, 399/352, 358, 359
See application file for complete search history.

(56) References Cited

U.S. PATENT DOCUMENTS 4,427,289 A 1/1984 Oda

FOREIGN PATENT DOCUMENTS

| | | |
|---|---|---|
| JP | 5-181397 | 7/1993 |
| JP | 9-062166 | 3/1997 |
| JP | 9-106235 | 4/1997 |
| JP | 9-120207 | 5/1997 |

*Primary Examiner*—Susan Lee
(74) *Attorney, Agent, or Firm*—Akin Gump Strauss Hauer & Feld, LLP

(57) ABSTRACT

An electrophotographic printer has a toner [recycling] *transporting* mechanism with a belt conveyor that transports toner from a toner collection chamber, in which toner removed from the photosensitive drum of the printer is collected, to a toner delivery chamber[, from which toner is returned to the developing unit of the printer]. The belt conveyor is disposed in a channel that loops around the ends of roller shafts in the printer, and does not increase the width of the printer. The toner [recycling] *transporting* mechanism is easily assembled, and can be driven without motion irregularities.

42 Claims, 22 Drawing Sheets

TONER TRANSPORTING METHOD AND MECHANISM EMPLOYING A BELT CONVEYOR

Matter enclosed in heavy brackets [ ] appears in the original patent but forms no part of this reissue specification; matter printed in italics indicates the additions made by reissue.

BACKGROUND OF THE INVENTION

The present invention relates to a method and a mechanism for [recycling] *transporting* toner in an electrophotographic printer.

An electrophotographic printer forms a lateral electrostatic image on a photosensitive drum, develops the image by application of toner, then transfers the toner from the drum to a printing medium such as a sheet of paper. In many electrophotographic printers, the photosensitive drum and developing unit are part of a replaceable cartridge that also includes a cleaning unit for cleaning the photosensitive drum by removing toner that fails to be transferred to the printing medium.

Many electrophotographic printers have a recycling mechanism that returns toner form the cleaning unit to the developing unit, so that toner recovered by the cleaning unit can be reused. Such recycling of toner has several advantages: more pages can be printed before the toner supply has to be replenished; no tank is needed to store toner removed by the cleaning unit; and the toner removed by the cleaning unit does not have to be disposed of.

The toner recycling mechanism is part of the replaceable cartridge. A conventional toner recycling mechanism comprises three helical screw conveyors. The first screw conveyor conveys toner to one end of the cleaning unit. The second screw conveyor conveys toner from this end of the cleaning unit to the corresponding end of the developing unit. The third screw conveyor conveys toner into the developing unit.

The replaceable cartridge also includes various rollers, such as a developing roller for applying toner to the photosensitive drum and a supply roller for supplying toner to the developing roller. The first and third screw conveyors of the toner recycling mechanism are oriented parallel to these rollers, but the second screw conveyor is oriented at a right angle to the rollers. To avoid interference with the rollers, the second screw conveyor must be disposed at one side of the cartridge, beyond the ends of the roller shafts. The cartridge must accordingly be widened to accommodate the second screw conveyor, but this undesirably increase the dimensions of the printer.

Another disadvantage of the conventional toner recycling mechanism is that the second screw conveyor must be driven by a gear train including a worm gear. This type of gear train produces a thrust force that places an extra load on the driving motor, leading to uneven motion and irregular printing. The existence of the worm gear train also makes the replaceable cartridge more difficult to assemble.

SUMMARY OF THE INVENTION

It is accordingly an object of the present invention to provide a toner [recycling] *transporting* method and mechanism that do not increase the dimensions of an electrophotographic printer.

Another object of the invention is to provide a toner [recycling] *transporting* method and mechanism that do not cause printing irregularities.

Another object is to provide a toner [recycling] *transporting* mechanism that is easy to assemble.

The invented toner [recycling] *transporting* method uses a belt conveyor to transport toner from a toner collection chamber, in which toner removed from the photosensitive drum of an electrophotographic printer is collected, to a toner delivery chamber[, from which the toner is returned to the developing unit of the printer].

The invented toner [recycling] *transporting* mechanism comprises a side frame supporting one end of the shaft of a roller in the developing unit of the printer. The side frame has a channel forming a loop around the end of the shaft. A pick-up station is disposed at one end of the loop, and a discharging station at another end of the loop.

A cleaning unit removes toner from the photosensitive drum. The toner removed by the cleaning unit is held in a toner collection chamber that opens into the channel at the pick-up station. A conveyor in the toner collection chamber carries the toner to the pick-up station.

A belt conveyor disposed in the channel carries the toner from the pick-up station to the discharging station. At the discharging station, the toner is discharged into a toner delivery chamber[, from which another conveyor returns the toner to the developing unit].

The belt conveyor preferably has ribs, pockets, cut-out holes, or teeth for carrying the toner. The belt conveyor may also have a longitudinal rib that fits into a groove in the channel, to prevent the belt conveyor from being installed in the wrong orientation. The belt conveyor maybe driven by a pulley disposed inside the loop of the channel, by a toothed wheel disposed outside the loop, or by a toothed end of the conveyor in the toner delivery chamber. Torque may be transmitted to the belt conveyor by an idle gear turning on a stationary shaft, in which case a groove is preferably provided on the outer surface of the stationary shaft, or the inner surface of the idle gear, to permit the escape of toner or other foreign matter that becomes caught between the idle gear and stationary shaft. Vibration may be imparted to the belt conveyor by an interfering member to promote the release of toner at the discharging station.

The channel that houses the belt conveyor is disposed inboard of the end of the shaft of the roller in the developing unit, so the invented toner [recycling] *transporting* mechanism does not increase the dimensions of the printer.

No worm gear is required to drive the belt conveyor, so printing irregularities due to the thrust produced by a worm gear are avoided.

The invented toner [recycling] *transporting* mechanism is easy to assemble because it has relatively few parts.

DETAILED DESCRIPTION OF THE INVENTION

Embodiments of the invention will be described to reference to the attached illustrative drawings. As an illustration of the type of printer in which the invention can be employed, and of the type of toner [recycling] *transporting* mechanism that the invention replaces, a brief description of an electrophotographic printer with a conventional toner [recycling] *transporting* mechanism will be given first.

Figure 1:
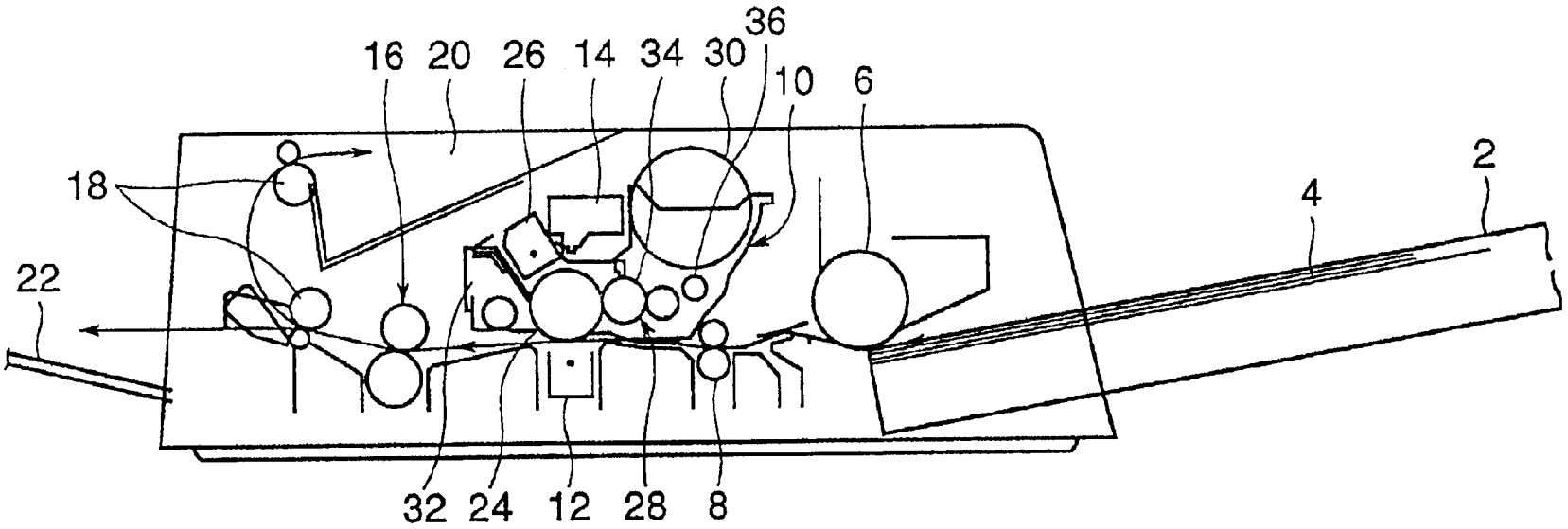
FIG.1 PRIOR ART
FIG. 1 shows a sectional view of an electrophotographic printer.

FIG. 1 shows the main parts of this printer. A paper cassette 2 holds sheets of paper 4, which are fed by hopping roller 6 and a pair of transport rollers 8 on a paper path because a replaceable cartridge, referred to below as the printing process cartridge 10, and a transfer unit 12. An optical printing head 14 creates an image that is developed in the printing process cartridge 10 and transferred by the transfer unit 12 to a sheet of paper 4. The transferred image is fused onto the paper by a fusing unit 16. A pair of delivery rollers 18 feeds the resulting printed pages to a face-down delivery tray 20 or a face-up delivery tray 22.

The printing process cartridge 10 comprises a photosensitive drum 24, a charging unit 26 that charges the photosensitive drum 24 to a uniform potential preparatory to image formation, a developing unit 28 that develops the image by applying toner, a toner cartridge 30 from which the toner is supplied, and a cleaning unit 32 that removes remaining toner from the photosensitive drum 24 after transfer of the image to the paper 4. The developing unit 28 comprises a developing roller 34 that applies toner to the surface of the photosensitive drum 24, and a supply roller 36 that supplies toner to the developing roller 34.

Figure 2:
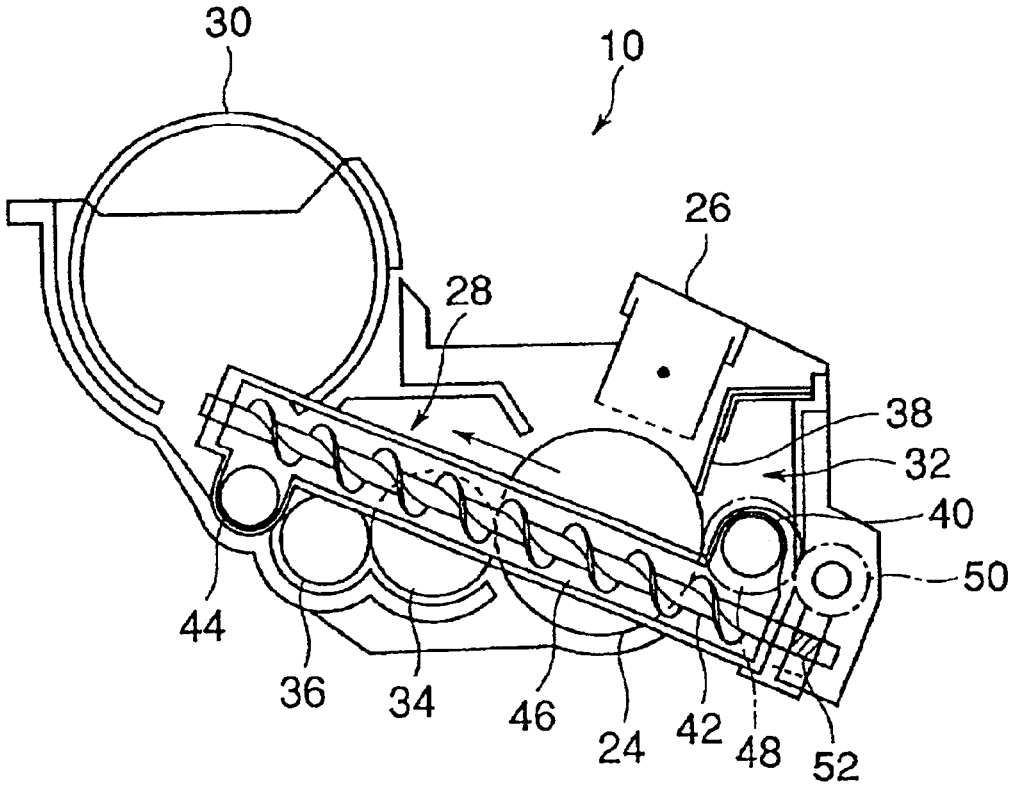
FIG.2 PRIOR ART
FIG. 2 shows a side view of a conventional toner [recycling] *transporting* mechanism.

FIG. 2 is an enlarged view of the printing process cartridge 10 as seen from the opposite side, showing the cleaning blade 38 of the cleaning unit 32, and the three screw conveyors 40, 42, and 44 of the conventional toner [recycling] *transporting* mechanism. The first screw conveyor 40 brings toner from the cleaning unit 32 to the base of the second screw conveyor 42, which carries the toner upward through an inclined passage 46 to the third screw conveyor 44, as indicated by the arrow. The second screw conveyor is driven by a gear train comprising gears 48, 50, and 52.

Figure 3:
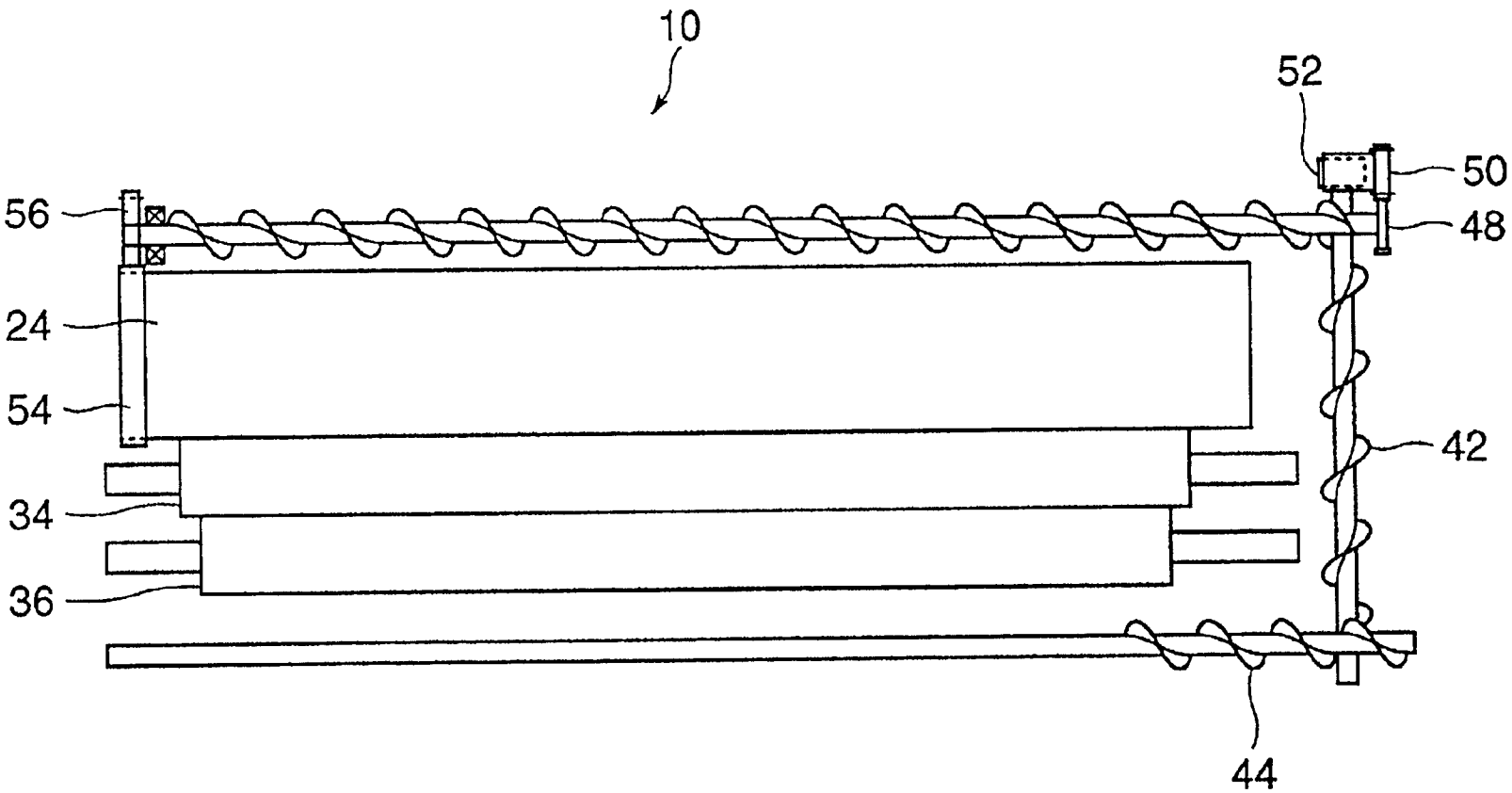
FIG.3 PRIOR ART
FIG. 3 shows a plan view of the conventional toner [recycling] *transporting* mechanism.

FIG. 3 shows how the three screw conveyors 40, 42, and 44 are disposed in relation to the photosensitive drum 24, developing roller 34, and supply roller 36, illustrating the fact that the printing process cartridge 10 must be widened to accommodate the second screw conveyor 42. FIG. 3 also shows two additional gears 54 and 56 by which the first screw conveyor 40 is driven. The rotation of the photosensitive drum 24 is transmitted by gears 54 and 56 to the first screw conveyor 40, then by gear 48, 50, and 52 to the second screw conveyor 42. Gear 50 is a worm gear.

The rotation of the photosensitive drum 24 is also transmitted by gears (not shown) to the rollers 34 and 36 and the third screw conveyor 44. The photosensitive drum 24 is driven by a motor (not visible).

Figure 4:
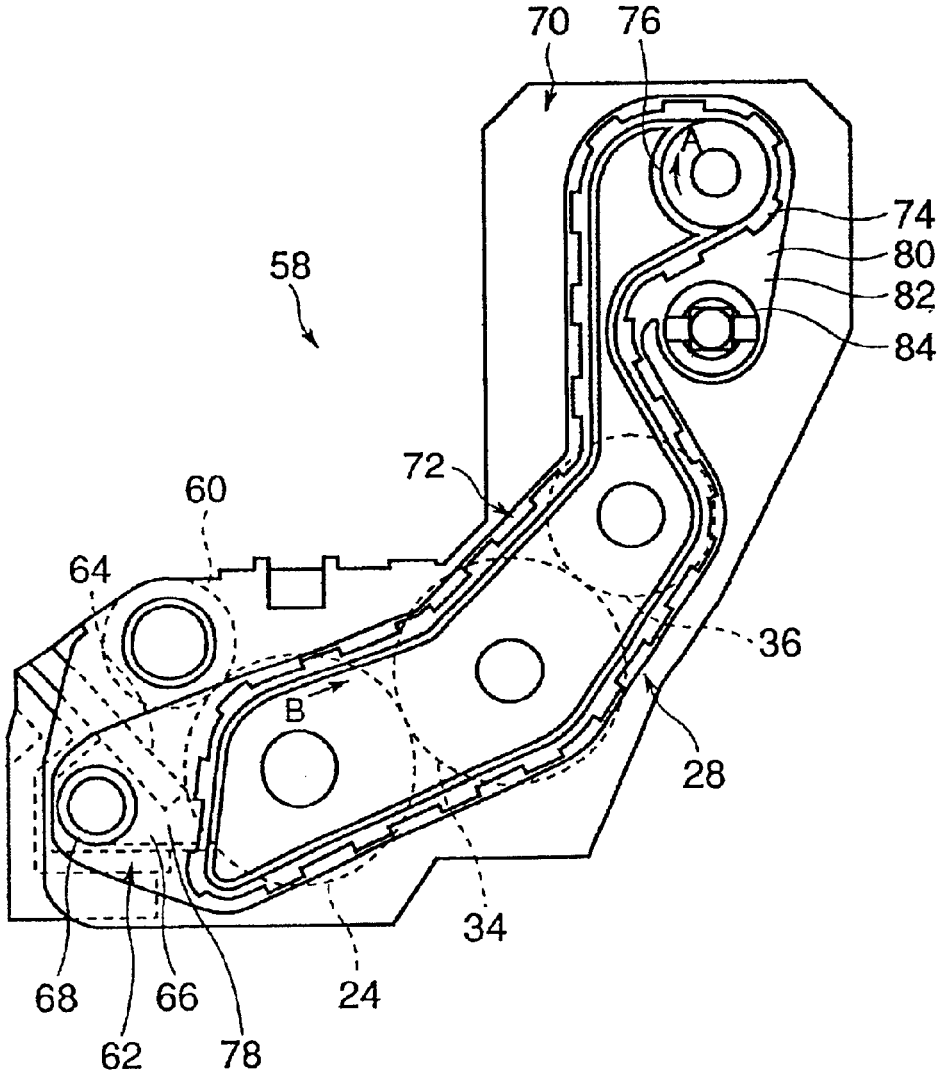
FIG. 4 shows a side view of a toner [recycling] *transporting* mechanism according to a first embodiment of the invention.

FIG. 4 shows a side view of a printing process cartridge 58 having a toner [recycling] *transporting* mechanism according to a first embodiment of the invention. The photosensitive drum 24 and the developing unit 28 with its developing roller 34 and supply roller 36 are similar to the corresponding elements in FIG. 1. Whereas FIG. 1 showed a charging unit 26, FIG. 4 shows a charging roller 60, which makes contact with the surface of the photosensitive drum 24 to apply a uniform electrostatic charge. The printing process cartridge 58 also has a toner cartridge (not visible) similar to the one in FIG. 1.

The cleaning unit 62 in FIG. 4 has a cleaning blade 64 that scrapes toner from the surface of the photosensitive drum 24, allowing the toner to fall into a toner collection chamber 66. A screw conveyor 68 brings the collected toner to one end of the toner collection chamber 66.

The side frame or toner [recycling] *transporting* portion 70 on the illustrated side of the printing process cartridge 58 has a channel 72 that loops around the ends of the shafts of the photosensitive drum 24 and the rollers 34 and 36 in the developing unit 28. The channel 72 is occupied by a belt conveyor 74. A pulley 76 at one end of the channel 72, disposed inside the loop of the channel 72, turns in the decision of arrow A, moving the belt conveyor 74 in the direction of arrow B. At the other end, the channel 72 opens into the toner collection chamber 66 of the cleaning unit 62. The pick-up station 78 of the belt conveyor 74 is disposed in the region where the channel 72 meets the toner collection chamber 66 i.e., a first portion; the discharge station 80 of the belt conveyor 74 is disposed beneath the pulley 76 i.e., second portion. The belt conveyor 74 discharges into a toner delivery chamber 82, from which a screw conveyor 84 carries toner to the developing unit 28.

Figure 5:
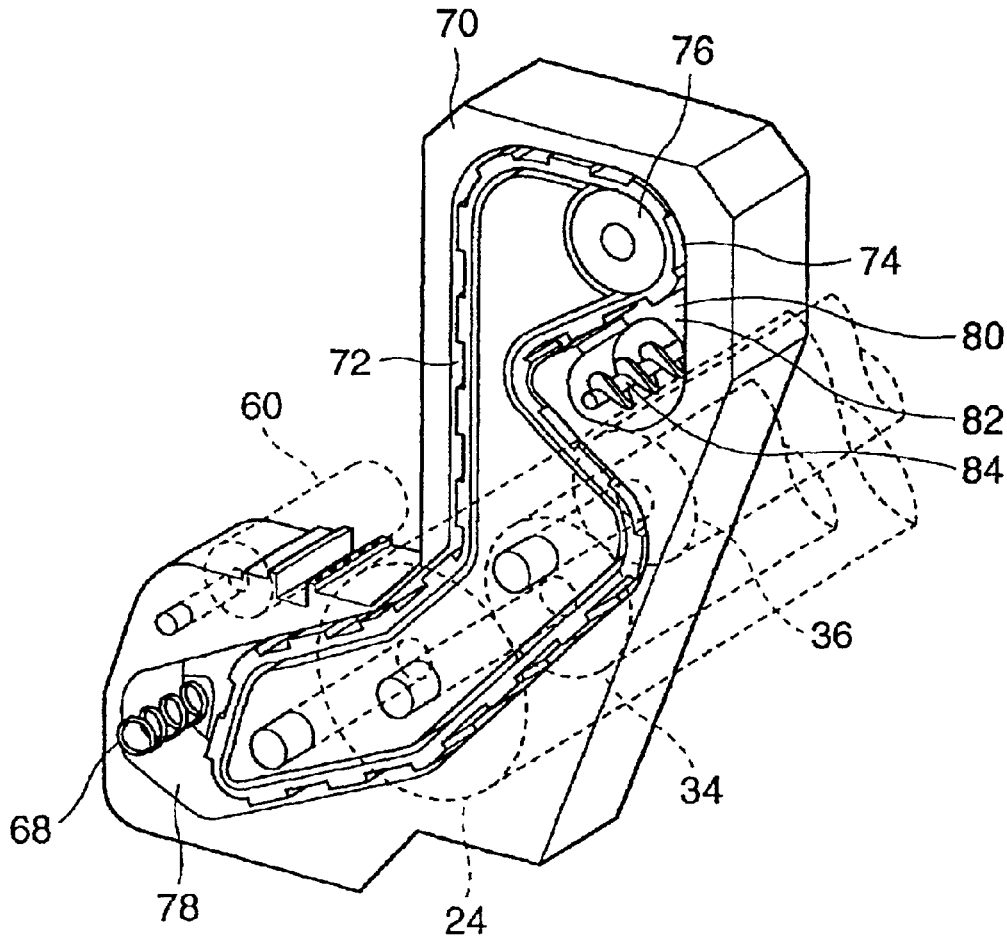
FIG. 5 shows a perspective view of the toner [recycling] *transporting* mechanism in FIG. 4.

FIG. 5 is a perspective view of the side frame or toner [recycling] *transporting* portion 70, showing that the ends of the shafts of the photosensitive drum 24, developing roller 34, supply roller 36, and charging roller 60 extend outboard from the surface of the side frame or toner [recycling] *transporting* portion 70, while the channel 72 extends inboard from this surface. The channel 72 and belt conveyor 74 accordingly do not increase the width of the printing process cartridge 58. Nor is the width increased by the screw conveyors 68 and 84 and pulley 74, since the ends of their shafts extend less far outboard than do the ends of the shafts of the photosensitive drum 24, developing roller 34, supply roller 36, and charging roller 60.

Figure 6:
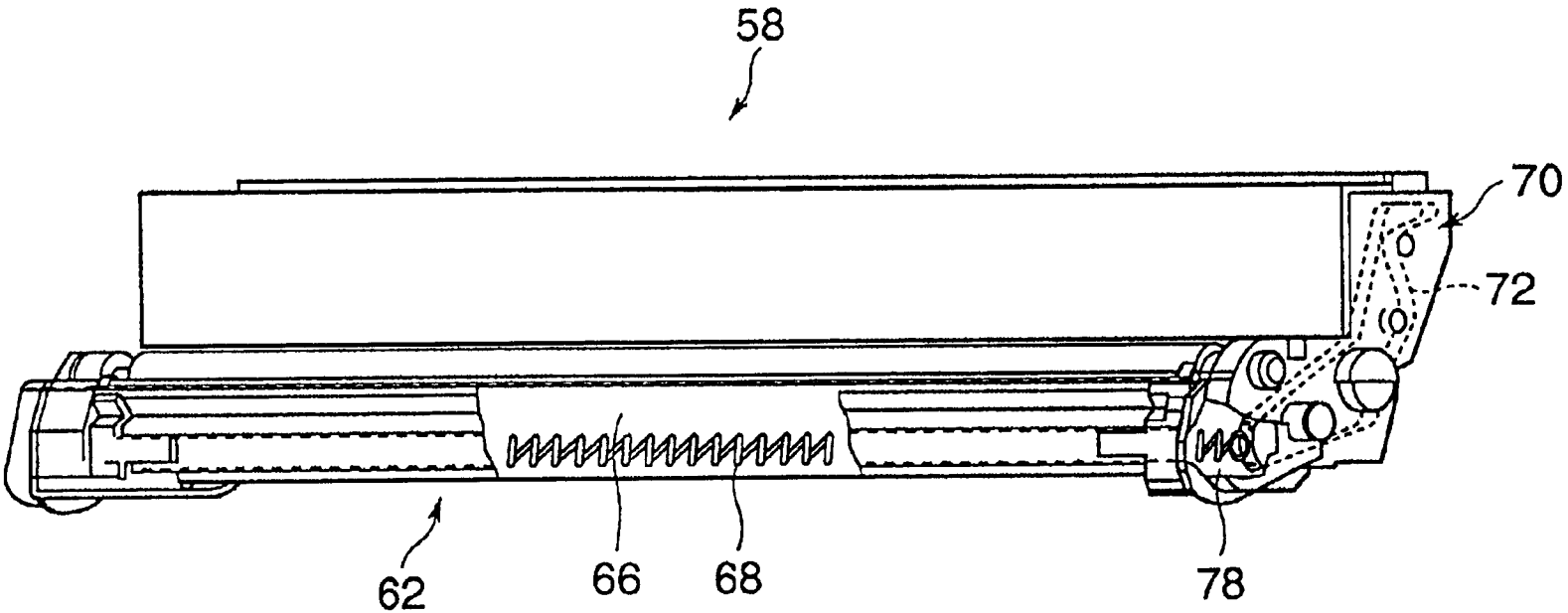
FIG. 6 is a partly cutaway perspective view showing the conveyor in the toner collection chamber in FIG. 4.
Figure 7:
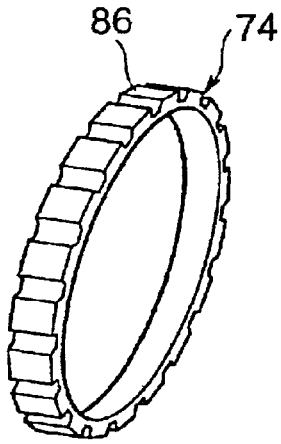
FIG. 7 is a perspective view showing one possible configuration of the belt conveyor in the first embodiment.
Figure 8:
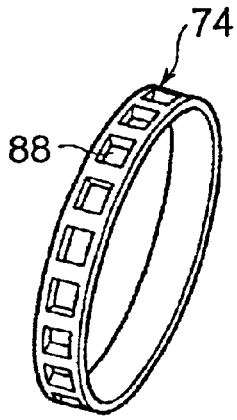
FIG. 8 is a perspective view showing another possible configuration of the belt conveyor in the first embodiment.
Figure 9:
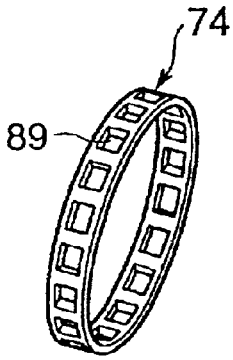
FIG. 9 is a perspective view showing another possible configuration of the belt conveyor in the first embodiment.

FIG. 6 is a partially cutaway perspective view showing the screw conveyor 68 in the toner collection chamber 66. The side frame or toner [recycling] *transporting* portion 70 has a side cover that prevents toner from escaping from the channel 72. This cover is also partially cut away in FIG. 6, to show the pick-up station 78 where toner brought by the screw conveyor 68 is transferred to the belt conveyor 74. To facilitate transport of the toner, the belt conveyor 74 may have raised lateral ribs 86 as shown in FIG. 7, or depressed pockets 88 as shown in FIG. 8. Alternatively, the belt conveyor 74 maybe a mesh belt with cut-out holes 89 as shown in FIG. 9.

Figure 10A:
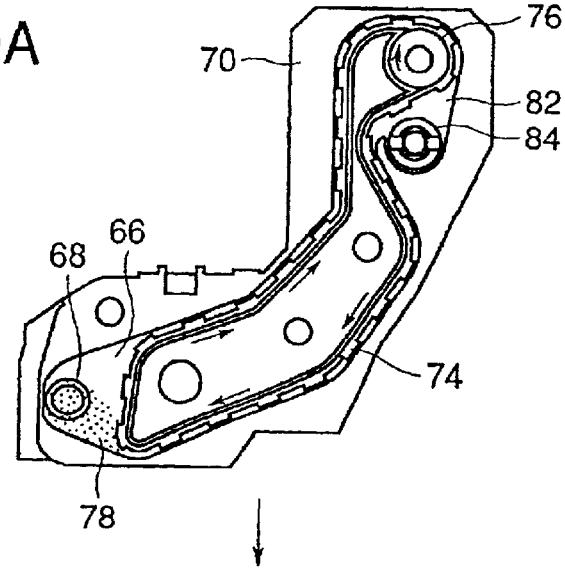
FIG. 10A, FIG. 10B, and FIG. 10C are side views of the first embodiment, illustrating the transport of toner by the belt conveyor.
Figure 10B:
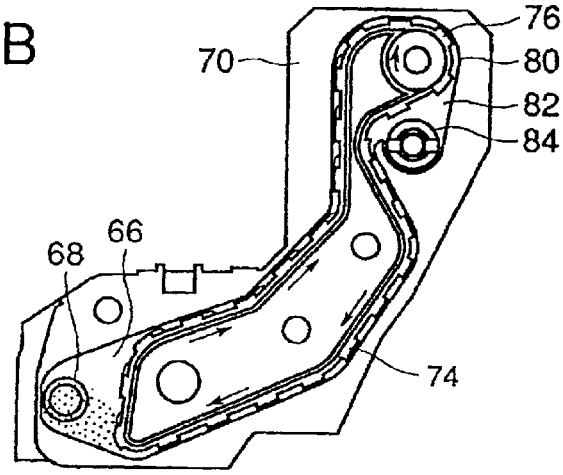
Figure 10C:
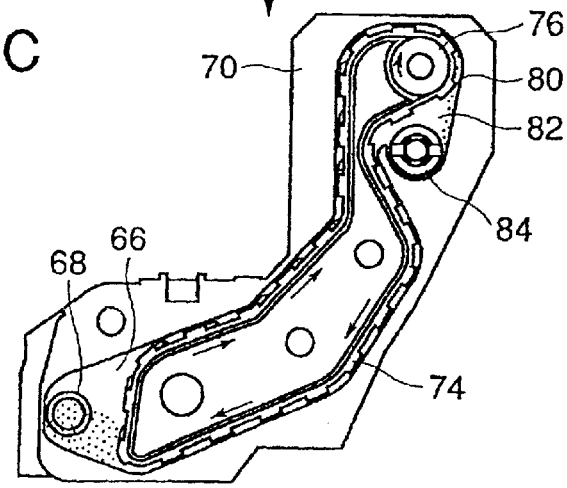

The invented toner [recycling] *transporting* mechanism operates as follows. The motor (not shown) that drives the photosensitive drum 24 also drives the pulley 76 and the screw conveyors 68 and 84. As the photosensitive drum 24 turns past the cleaning blade 64, remaining toner is removed and drops into the toner collection chamber 66. Screw conveyor 68 brings this toner to the pick-up station 78 at the lower end of the channel 72, as shown in FIG. 10A. The belt conveyor 74 carries the toner upward toward the pulley 76 as shown in FIG. 10B. At the discharge station 80, the toner carried by the belt conveyor 74 drops into the toner delivery chamber 82 as shown in FIG. 10C, and is fed by screw conveyor 84 to a more central part of the toner delivery chamber 82. From there, the toner falls back into the developing unit 28, to be picked up by the supply roller 36 and supplied again to the developing roller 34.

As pointed out above, the invented toner [recycling] *transporting* mechanism does not require the width of the printing process cartridge 58 to be increased. The toner [recycling] *transporting* mechanism in the first embodiment is also easier to assemble than the conventional toner [recycling] *transporting* mechanism, because the belt conveyor 74 is driven by a single pulley 76 instead of a worm gear train. The problem of thrust that was present in the worm gear train is also eliminated, so printing is more regular.

Next, a second embodiment will be described.

Figure 11:
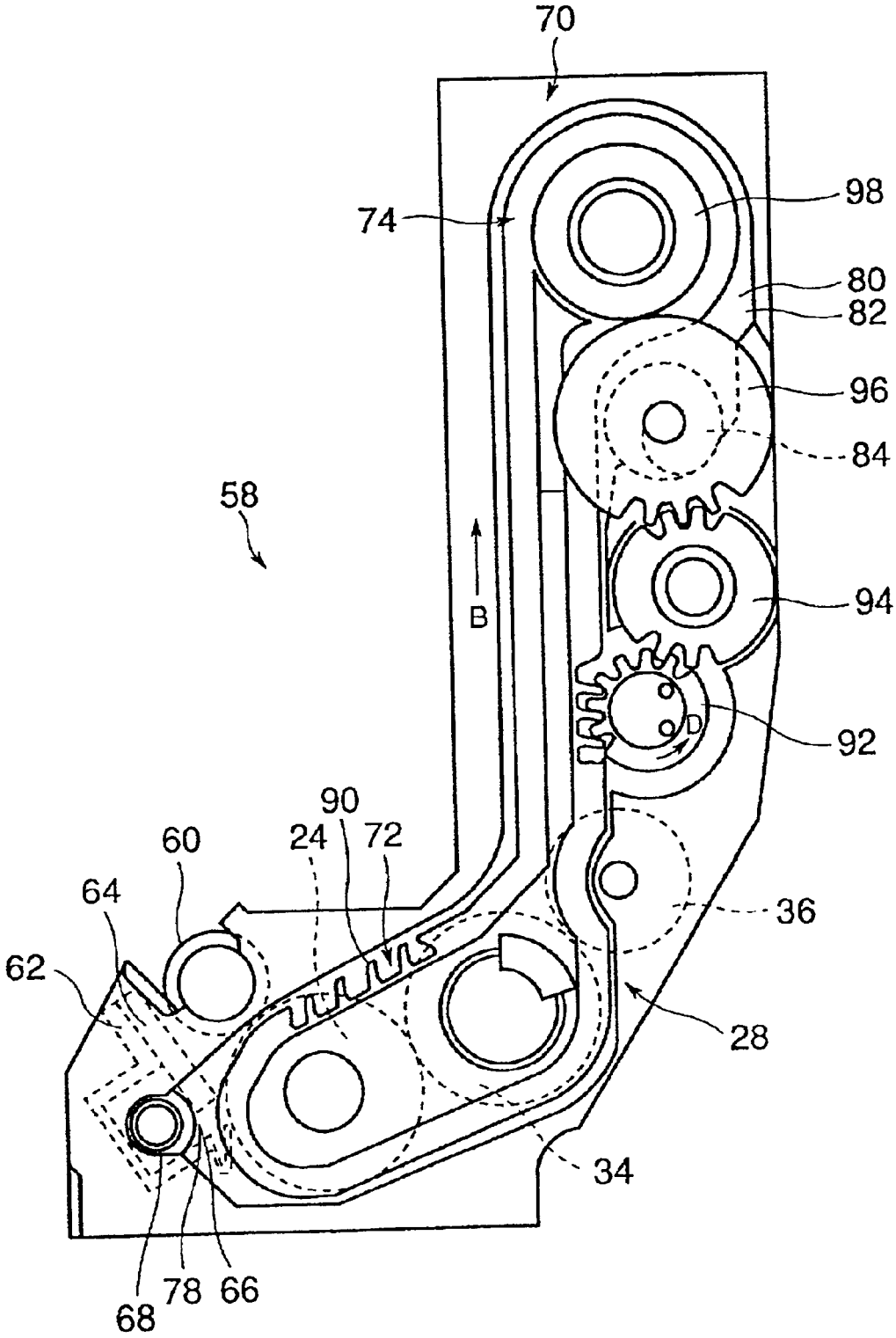
FIG. 11 shows a side view of a toner [recycling] *transporting* mechanism according to a second embodiment of the invention.

Referring to FIG. 11, the belt conveyor 74 in the second embodiment has teeth 90 that project at an angle in the direction of motion (arrow B) of the belt conveyor 34. These teeth 90 engage the teeth of a belt driving gear 92 which turns in the direction of arrow D and drives the belt conveyor 74 around the channel 72. By pushing against the teeth 90 of the belt conveyor 74, the belt driving gear 92 pulls the belt conveyor 74 downward in the drawing. The natural stiffness of the belt conveyor 74 also transmits the pushing force of the belt driving gear 92 forward, so that the belt conveyor 74 is both pushed and pulled around the channel 72.

The belt driving gear 92 also drives an idle gear 94, which drives a gear 96 that turns the screw conveyor 84. The pulley 98 at the top of the channel 72 turns freely. The purpose of the pulley 98 in the second embodiment is not to drive the belt conveyor 74, but to enable the belt conveyor 74 to negotiate the sharp turn at the top of the channel 72 without friction.

Figure 12:
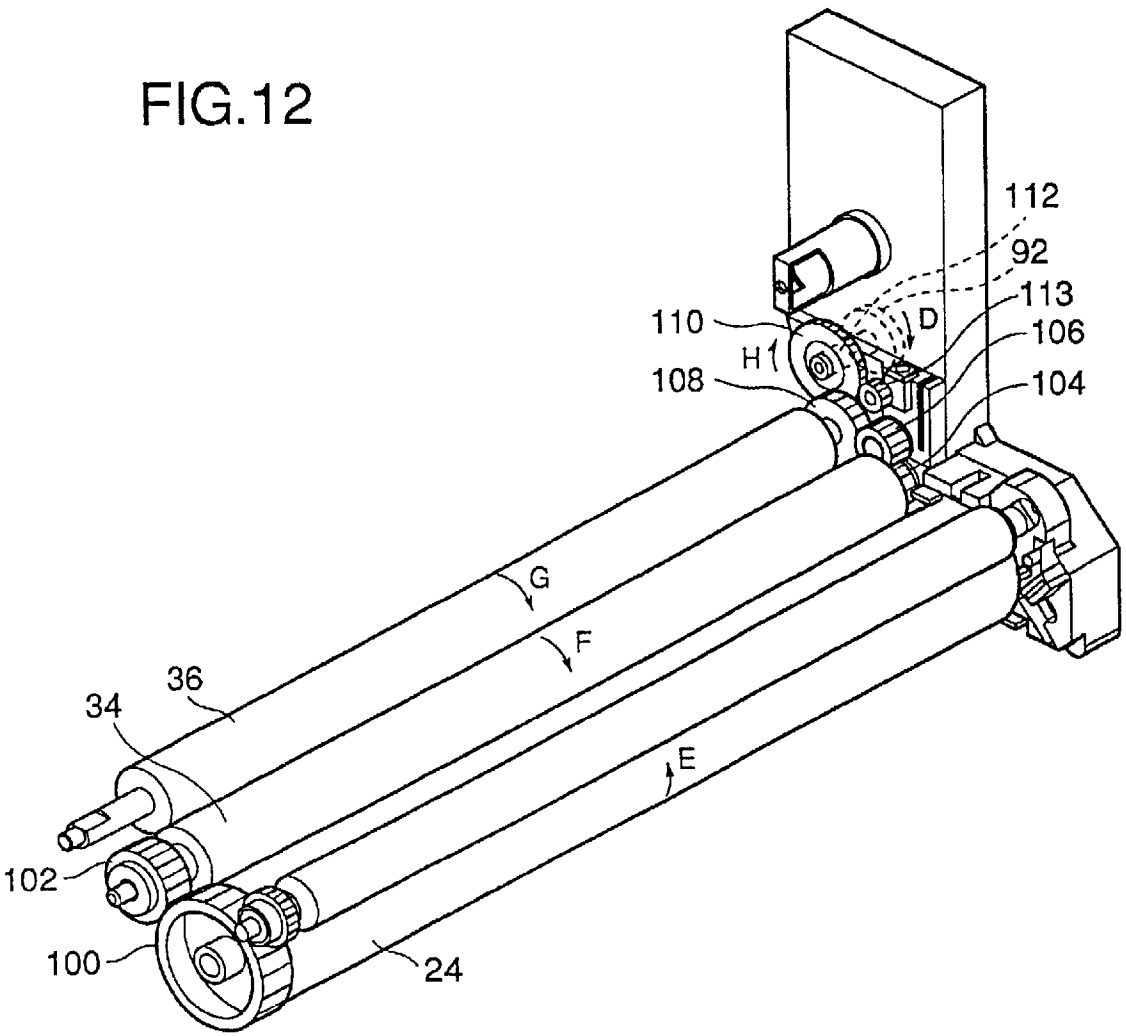
FIG. 12 is a perspective view illustrating the gear train by which the toner [recycling] *transporting* mechanism is driven in the second embodiment.

FIG. 12 shows how the belt driving gear 92 is driven. The photosensitive drum 24 is turned by a motor (not visible) as in the first embodiment. A gear 100 at one end of the shaft of the photosensitive drum 24, opposite from the end at which the toner [recycling] *transporting* mechanism is disposed, engages a similar gear 102 at the end of the shaft of the developing roller 34, so that the rotation of the photosensitive drum 24 also turns the developing roller 34. The driving torque is transmitted through the shaft of the developing roller 34 to another gear 104. Gear 104 drives an idle gear 106, which drive a gear 108 attached to the shaft of the supply roller 36. The photosensitive drum 24, developing roller 34, and supply roller 36 turn in the directions indicated by arrows E, F, and G.

The gear 108 attached to the shaft of the supply roller 36 also drives a gear 110 attached to the shaft 112 of the belt driving gear 92 in the toner [recycling] *transporting* mechanism. An idle gear 113 is provided between the gears 108 and 110, and the rotation of gear 108 is transmitted to gear 110 through idle gear 113, so that gear 110 turns in the direction of arrow H. The belt driving gear 92 is thereby driven in the direction of arrow D.

Figure 13:
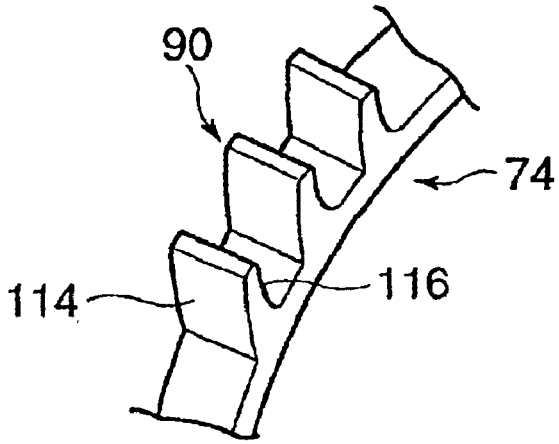
FIG. 13 is a perspective view of the belt conveyor in the second embodiment.

FIG. 13 is an enlarged view of the belt conveyor 74, showing the shape of the teeth 90. The outer face 114 of the teeth preferably has a convex involute shape against which the teeth of the belt driving gear 92 can press without friction. The inner face 116 has a concave involute shape, generally following the contour of the outer face 114.

Figure 14:
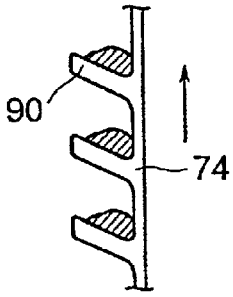
FIG. 14 is a side view illustrating the efficient vertical transport of toner by the belt conveyor in the second embodiment.
Figure 15:
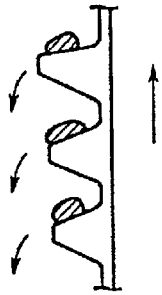
FIG. 15 is a side view illustrating less efficient vertical transport of toner by a belt conveyor with symmetrical teeth.

Referring to FIG. 14, the shape of the teeth 90 of the belt conveyor 74, angled in the forward direction, enables toner to be efficiently transported vertically upward. If the teeth of the belt conveyor 74 were to have a symmetrical shape, vertical transport would be less efficient; toner would fall back, as illustrated in FIG. 15.

Figure 16:
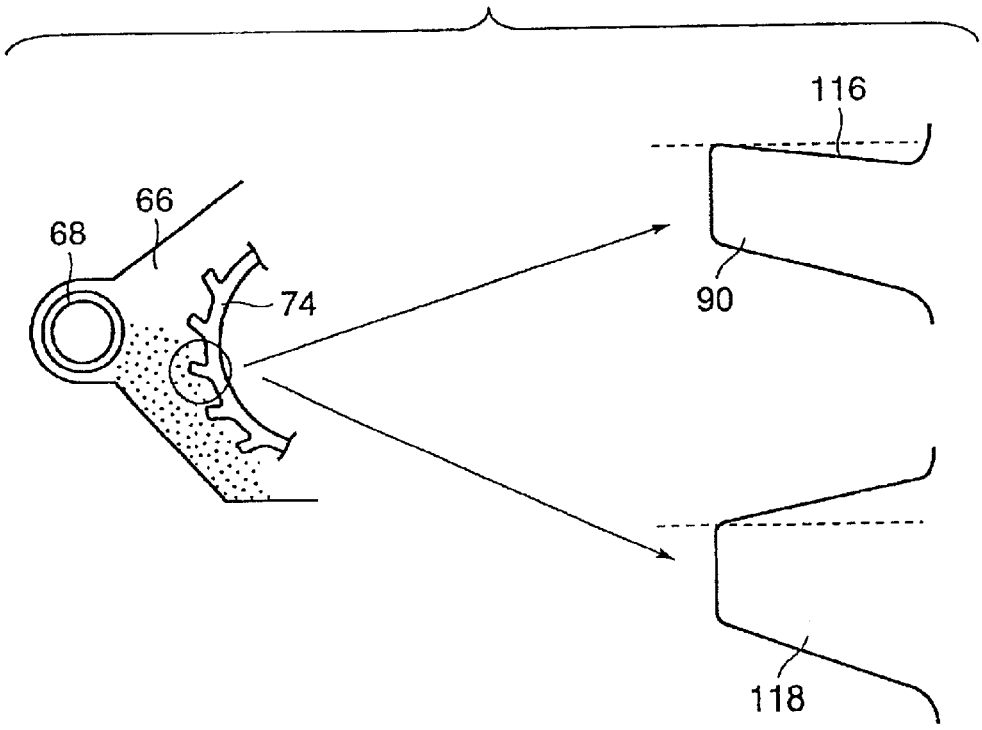
FIG. 16 is a schematic view comparing the scooping action of the belt conveyor in the second embodiment with the scooping action of a belt conveyor having symmetrical teeth.

Referring to FIG. 16, the shape of the inner face 116 of the teeth 90 is also suitable for scooping up toner in the toner collection chamber 66. As the belt conveyor 74 turns within the channel 72, scooping action begins when the inner end of a booth 90 is lower than the outer end. The sloping inner face 116 of the teeth 90 permits scooping to being earlier than would be possible with a symmetrically shaped tooth 118.

Referring again to FIGS. 11 and 13, the sloping outer surface 114 of the teeth 90 is also an advantage at the discharging station 80. This surface 114 slopes downward at the discharge station 80, allowing toner to fall freely into the toner delivery chamber 82.

By enabling the belt conveyor 74 to transport and discharge toner efficiently, without friction between the belt conveyor 74 and belt driving gear 92, the second embodiment reduces the torque load on the motor, contributing to quieter operation of the printer, more uniform driving of the photosensitive drum 24, and thus more uniform printed output.

The belt driving gear 92 need not be a gear with involute teeth; a sprocket wheel of the type used to drive an automotive timing belt can be used, or any other type of toothed wheel can be used, with suitable modification to the shape of the teeth 90 of the belt conveyor 74.

Next, a third embodiment will be described.

Figure 17:
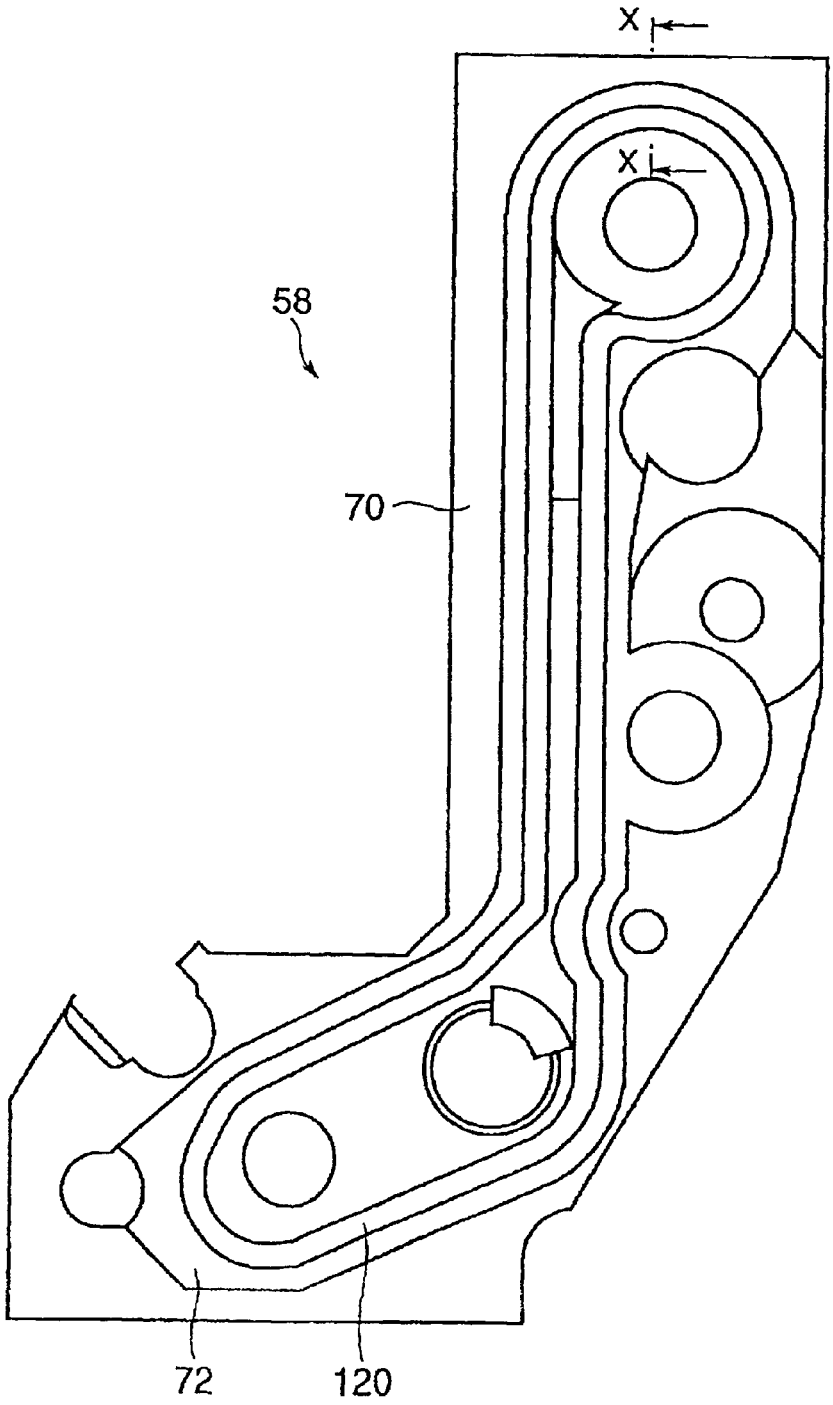
FIG. 17 shows a side view of a toner [recycling] *transporting* mechanism according to a third embodiment of the invention.

Referring to FIG. 17, the channel 72 in the third embodiment has an interior groove 120. The groove 120 is disposed in the floor of the channel 72, and extends around the entire length of the channel 72, adjacent the inner wall of the channel 72.

Figure 18:
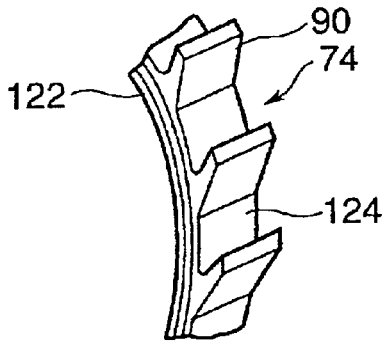
FIG. 18 shows a perspective view of the belt conveyor in the third embodiment.

Referring to FIG. 18, the belt conveyor 74 in the third embodiment is similar to the belt conveyor 74 in the second embodiment, with teeth 90 angled toward the intended direction of motion of the belt conveyor 74, but has an additional longitudinal rib 122 on one side. The longitudinal rib 122 extends for the entire length of the belt conveyor 74. The longitudinal rib 122 may be thinner than the body 124 of the belt conveyor 74, as shown in FIG. 18. Alternatively, the longitudinal rib 122 may have the same thickness as the body 124 of the belt conveyor 74.

Figure 19:
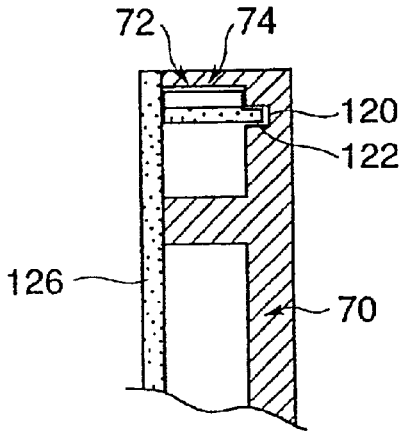
FIG. 19 is a sectional view through line X—X in FIG. 17, illustrating correct installation of the belt conveyor in the third embodiment.

Referring to the sectional view in FIG. 19, when the belt conveyor 74 is correctly oriented in the channel 72, the longitudinal rib 122 fits into the groove 120. The side frame or toner [recycling] *transporting* portion 70 has a side cover 126 that fits snugly against the side frame or toner [recycling] *transporting* portion 70 when the belt conveyor 74 is installed in the correct orientation.

Figure 20:
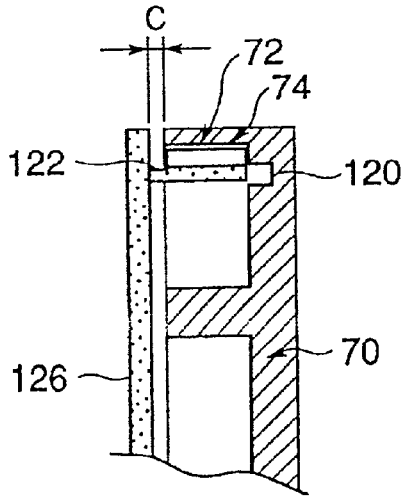
FIG. 20 is a similar sectional view illustrating incorrect installation of the belt conveyor in the third embodiment.

Referring to FIG. 20, if the belt conveyor 74 is installed in the wrong orientation, the longitudinal rib 122 projects above the surface of the side frame or toner [recycling] *transporting* portion 70, so that a gap C is left between the side cover 126 and the side frame or toner [recycling] *transporting* portion 70. When the printing process cartridge 58 is assembled, if the belt conveyor 74 is mistakenly installed in the wrong orientation, the gap C makes the mistake obvious. The side cover 126 cannot be attached to the side frame or toner [recycling] *transporting* portion 70 until the mistake is corrected. Assembly errors are thus avoided. The third embodiment assures that when the printing process cartridge 58 is assembled, the teeth 90 of the belt conveyor 74 are correctly oriented for scooping and transporting toner, and are not oriented in the reverse direction, which would render the belt conveyor 74 ineffective for the scooping and transport of toner.

Next, a fourth embodiment will be described. The fourth embodiment is similar to the third embodiment, except for the stationary shaft of the idle gear 94.

Figure 21:
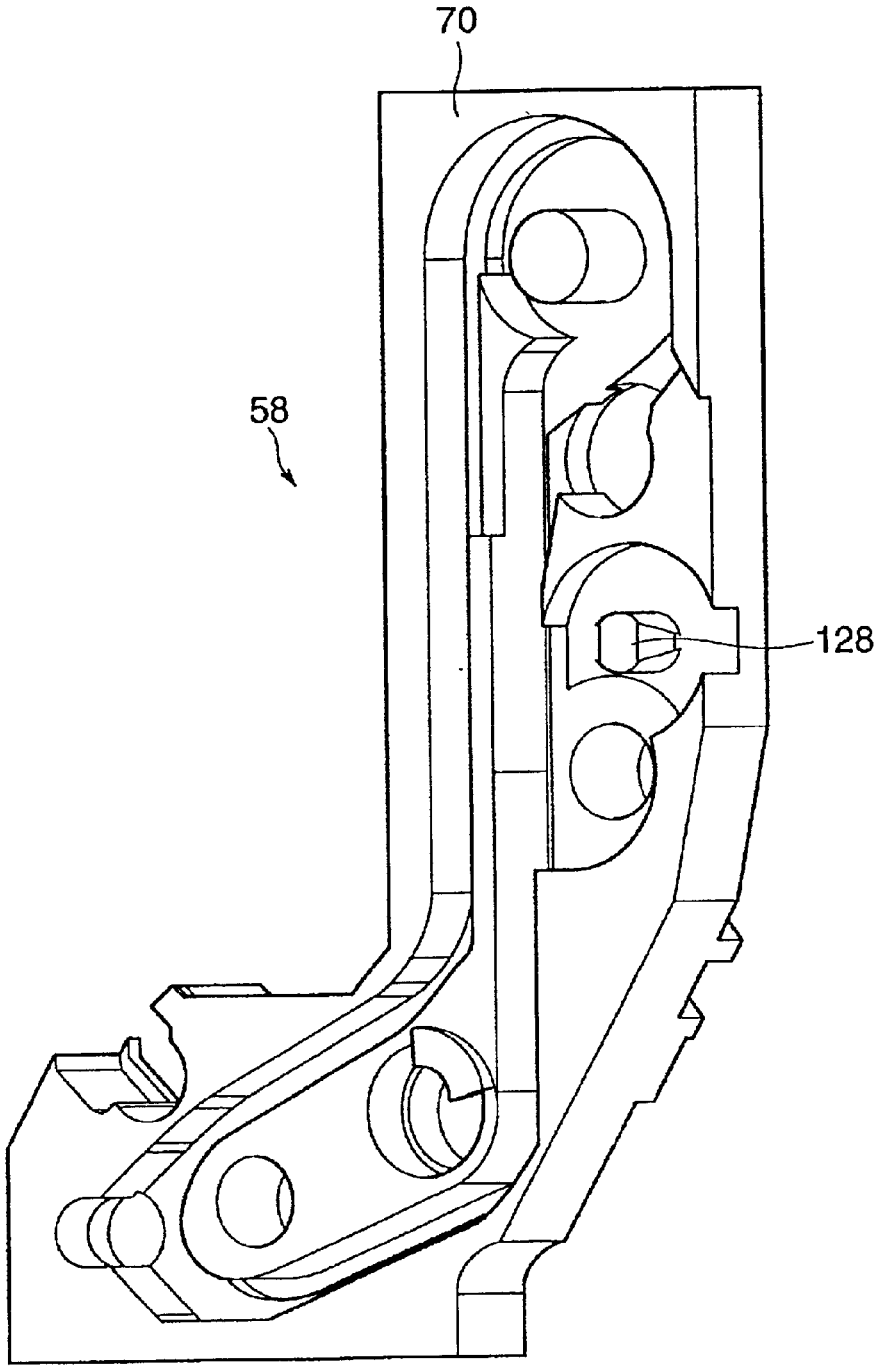
FIG. 21 is a perspective view showing the side frame in a toner [recycling] *transporting* mechanism according to a fourth embodiment of the invention.

Referring to FIG. 21, the stationary shaft 128 of the idle gear is made of the same material as the side frame or toner [recycling] *transporting* portion 70, and forms one part of the side frame or toner [recycling] *transporting* portion 70. The idle gear 94 itself may also be made of the same material.

Figure 22:
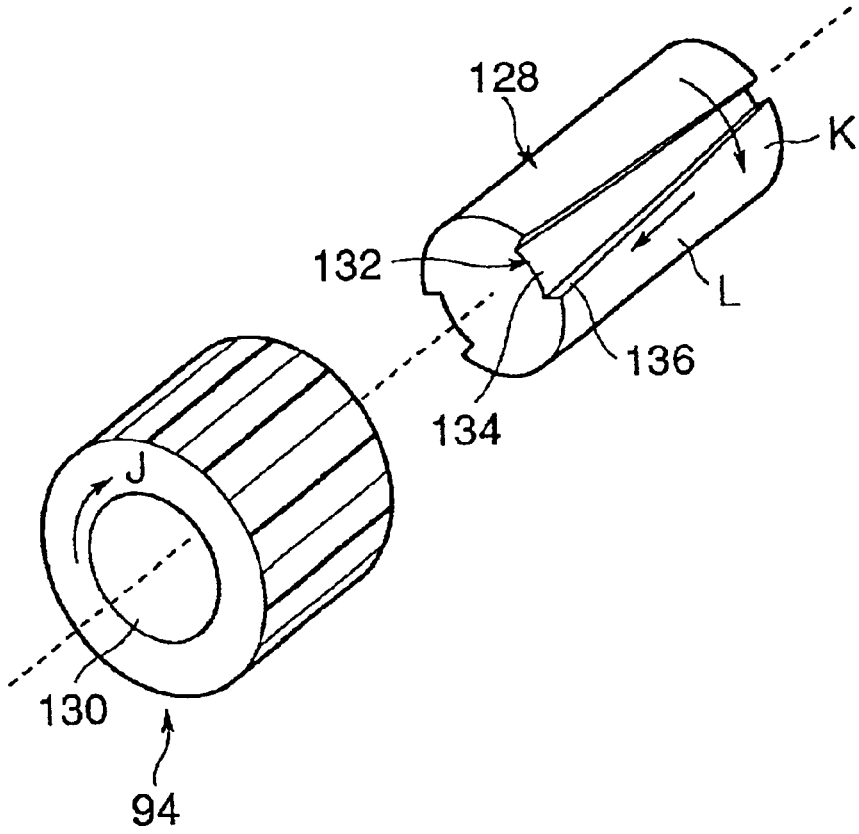
FIG. 22 is an exploded perspective view of the idle gear and its stationary shaft in the fourth embodiment.

The stationary shaft 128 fits into a central hole of the idle gear 94, as indicated by the dotted line in FIG. 22, permitting the idle gear 94 to turn freely, as indicated by arrow J. The sides of the stationary shaft 128 have a plurality of wedge-shaped grooves 132 (two grooves in the drawing), which are comparatively wide at the end 134 not attached to the side frame or toner [recycling] *transporting* portion 70, and are narrower at the attached end.

During printing, grains of toner or other foreign matter may find their way into the space between the idle gear 94 and its stationary shaft 128. The rotary motion of the idle gear 94 in direction J rolls these grains of foreign matter around the stationary shaft 128 in the direction of arrow K in FIG. 22, so that in a short time they drop into the grooves 132 in the shaft 128. As foreign matter collects in these grooves 132, the rotation of the idle gear 94 forces the foreign matter against the slanted side faces 136 of the grooves, thereby causing the foreign matter to slide in the direction of arrow L toward the free end 134 of the shaft 128. Foreign matter reaching the end 134 of a groove 132 can drop out into, for example, a passage provided in the side frame or toner [recycling] *transporting* portion 70, which will be described in a later embodiment.

By providing an escape route for foreign matter caught between the idle gear 94 and its stationary shaft 128, the grooves 132 prevent foreign matter from accumulating and causing friction between the idle gear 94 and shaft 128. The torque load on the motor that drives the photosensitive drum 24 and the toner [recycling] *transporting* mechanism is accordingly not increased due to such friction, and printing irregularities that might be caused by such friction are avoided.

Next, a fifth embodiment will be described. The fifth embodiment is similar to the fourth embodiment, except for the groove pattern on the stationary shaft 128 of the idle gear 94.

Figure 23:
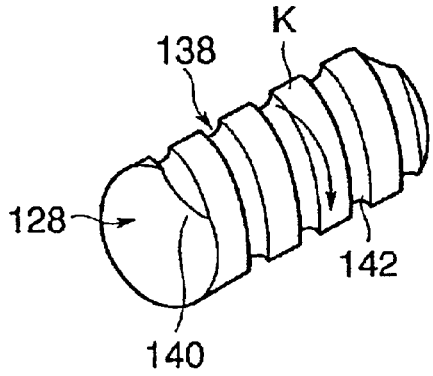
FIG. 23 is a perspective view of the stationary shaft of the idle gear in a toner [recycling] *transporting* mechanism according to a fifth embodiment of the invention.

Referring to FIG. 23, in the fifth embodiment, the stationary shaft 128 in the fifth embodiment has a groove 138 that follows a counterclockwise helical path toward the end 140 of the shaft that is not attached to the side frame 70. This helical groove 138 serves the same purpose as the grooves in the fourth embodiment. If particles of toner or other foreign matter enter the space between the idle gear 94 and stationary shaft 128, they are carried in the direction of arrow K by the rotation of the idle gear 94 until they drop into the helical groove 138. Contact with the rear side wall 142 of the helical groove 138 then pushes the foreign matter toward the free end 140 of the shaft, to be discharged into an appropriate passage.

The effect of the fifth embodiment is similar to the effect of the fourth embodiment: friction between the idle gear 94 and its stationary shaft 128 is avoided, a steady torque load is maintained on the driving motor, and printing irregularities are prevented.

Next, a sixth embodiment will be described. The sixth embodiment is similar to the fifth embodiment, but locates the helical groove on the inner surface of the idle gear 94 instead of the outer surface of its shaft.

Figure 24:
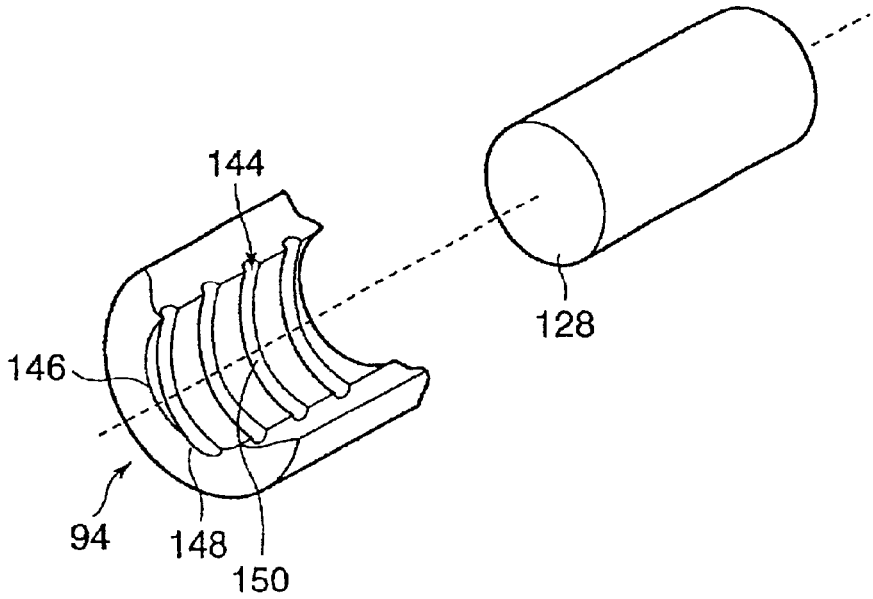
FIG. 24 is a perspective view of the idle gear in a toner [recycling] *transporting* mechanism according to a sixth embodiment of the invention.

Referring to FIG. 24, the idle gear 94 in the sixth embodiment has a helical groove 144 that follows a clockwise helical path around the inner surface 146 of the idle gear 94, from the end of the idle gear 94 adjacent the side frame 70 to the opposite end 148. The outer surface of the stationary shaft 128 is smooth. If particles of foreign matter enter the space between the idle gear 94 and shaft 128, they are carried into the helical groove 144, then carried toward the end 148 of the idle gear 94 by contact with the rear side wall 150 of the helical groove 144, and thus discharged into an appropriate passage.

The sixth embodiment has the same effects as the fourth and fifth embodiments in reducing friction between the idle gear 94 and the shaft 128, maintaining a steady torque load on the driving motor, and preventing printing irregularities.

Next, a seventh embodiment will be described. The seventh embodiment provides for the return of toner from the belt driving gear 92 to the belt conveyor 74. The seventh embodiment also provides a passage for toner discharged from between the idler gear 94 and its stationary shaft in the fourth, fifth, and sixth embodiments.

Figure 25:
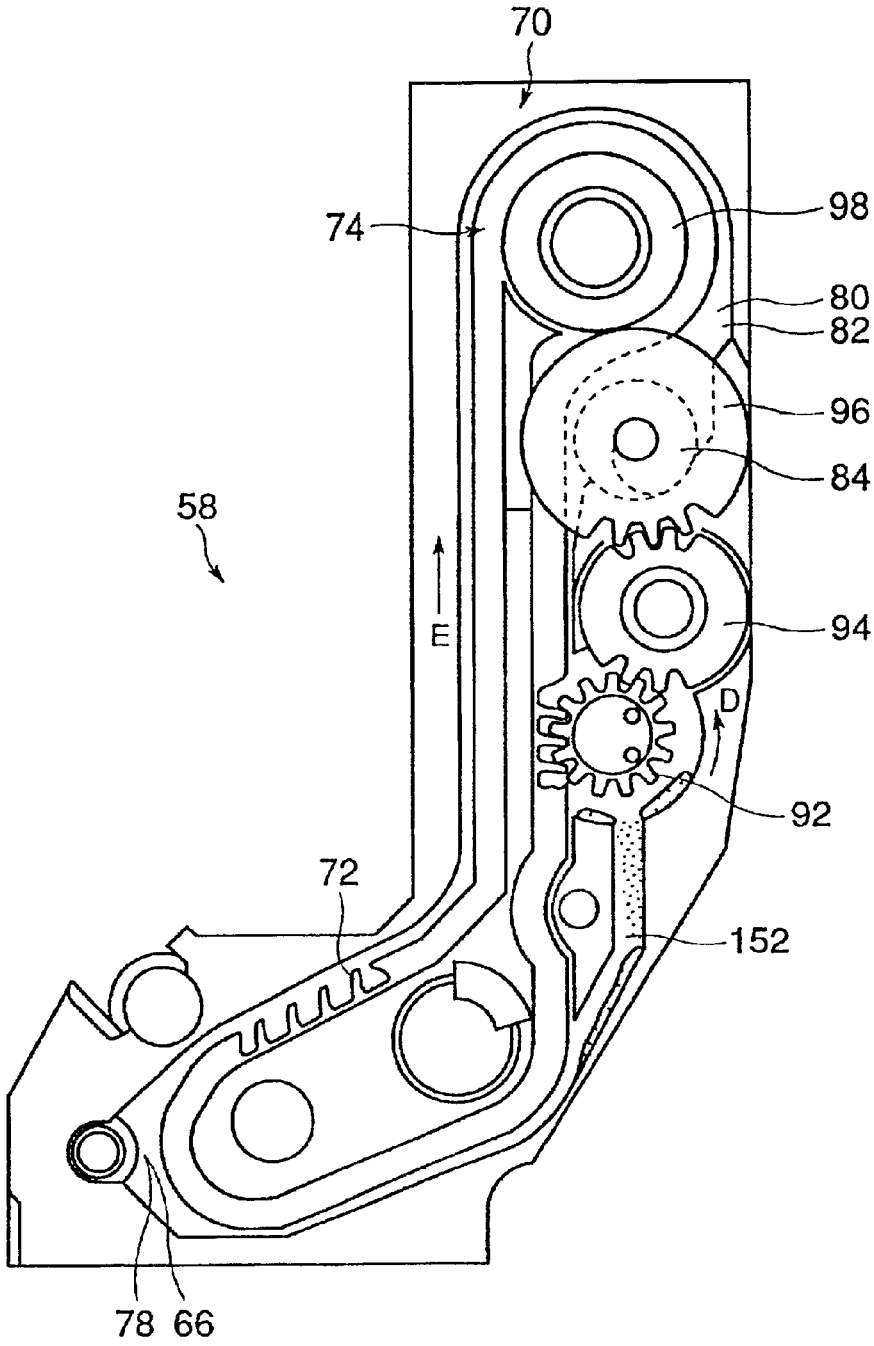
FIG. 25 is a side view showing a toner [recycling] *transporting* mechanism according to a seventh embodiment of the invention.

Referring to FIG. 25, this passage 152 starts below the belt driving gear 92, extends generally parallel to the channel 72 for a distance, then joins the channel 72 at a point from which the channel 72 slopes downward toward the toner collection chamber 66.

As described in the preceding embodiment, the belt conveyor 74 scoops up toner from the toner collection chamber 66 at the pick-up station 78, carries the toner to the discharging station 80, and discharges the toner into the toner delivery chamber 82. Some of the toner, however, adheres to the belt conveyor 74 and fails to be discharged. Some of this adhering toner is picked up by the teeth of the belt driving gear 92 when they engage the teeth of the belt conveyor 74, and adheres to the teeth of the belt driving gear 92. This adhering toner then falls from the belt driving gear 92 into the passage 152, is returned to the channel 72, is picked up again by the belt conveyor 74, and is carried into the toner collection chamber 66.

The passage 152 in the seventh embodiment prevents toner from accumulating in the space around the belt driving gear 92, where such toner might clog the teeth of the belt driving gear 92 and generally interfere with the rotation of this gear 92. By preventing such accumulation of toner, the seventh embodiment contributes to the maintenance of a steady torque load on the driving motor and the prevention of printing irregularities.

Next, an eighth embodiment of the invention will be described.

Figure 26:
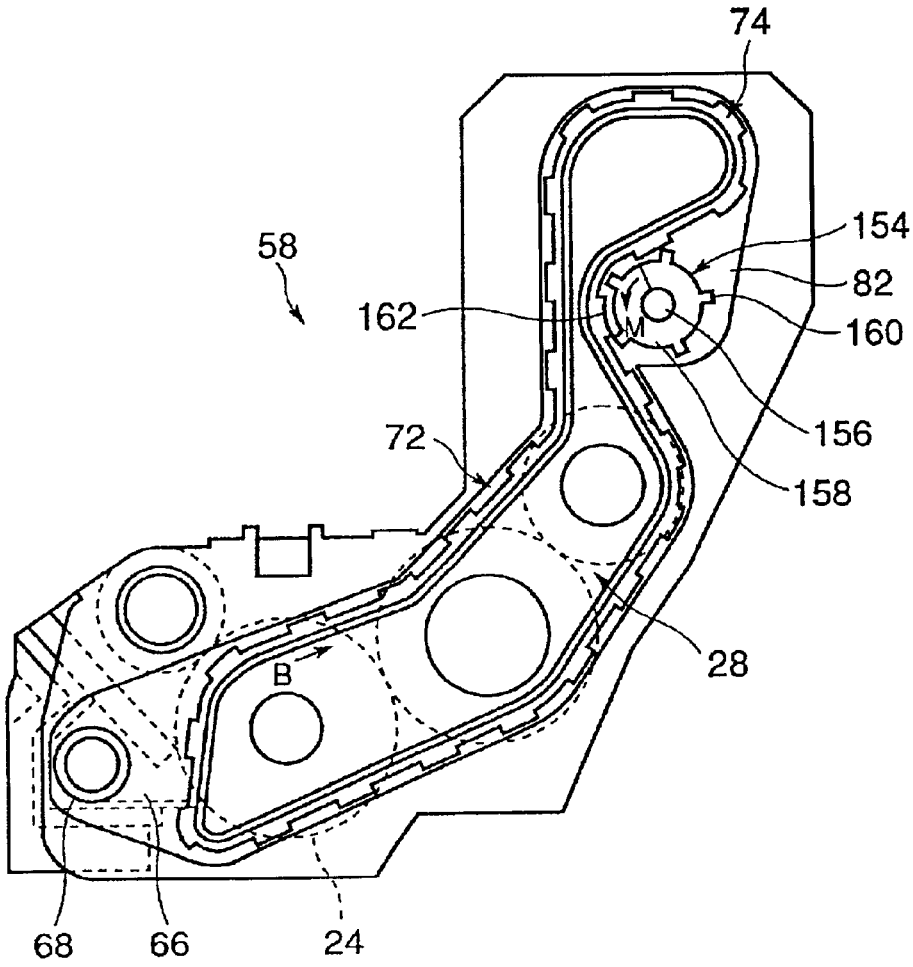
FIG. 26 is a side view showing a toner [recycling] *transporting* mechanism according to an eighth embodiment of the invention.

Referring to FIG. 26, in place of the pulley 76 and screw conveyor 84 of the first embodiment, the eighth embodiment has a toothed screw conveyor 154 extending into the toner delivery chamber 82 in substantially the same position as the screw conveyor 84 of the first embodiment. The toothed screw conveyor 154 comprises a shaft 156 and a helical screw 158, with teeth 160 extending from the outer edges of the helical screw 158 at one end. These teeth 160 engage lateral ribs 162 on the belt conveyor 74.

Figure 27:
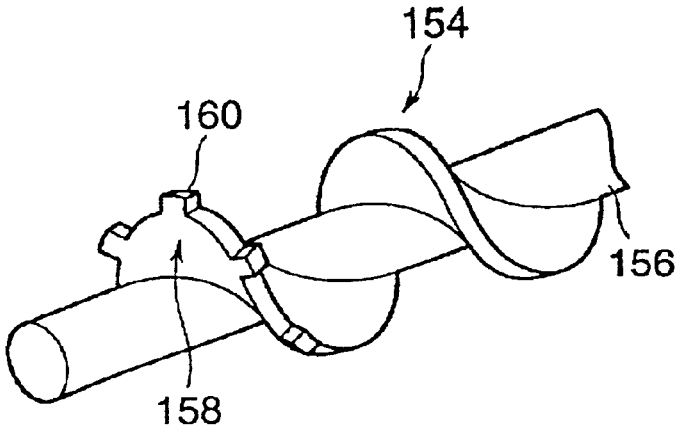
FIG. 27 is a perspective view of the toothed screw conveyor in the eighth embodiment.

FIG. 27 shows a perspective view of the toothed screw conveyor 154. The teeth 160 are disposed at the end of the helical screw 158, where the helical screw 158 meets the belt conveyor 74.

During printing, the shaft 156 of the toothed screw conveyor 154 is driven in the direction of arrow M in FIG. 26 by a gear train not shown in the drawing. The teeth 160 mesh with the lateral ribs 162 and the belt conveyor 74 is driven in the direction of arrow B, carrying toner from the toner collection chamber 66 to the toner delivery chamber 82. The helical screw 158 then carries the toner to the appropriate position in the toner delivery chamber 82 for delivery to the developing unit 28.

By replacing the pulley 76 and screw conveyor 84 of the first embodiment with a single toothed screw conveyor 154, the eighth embodiment reduces number of parts and hence the cost of the printing process cartridge 58. The cartridge 58 also becomes easier and thus less expensive to assemble.

Figure 28:
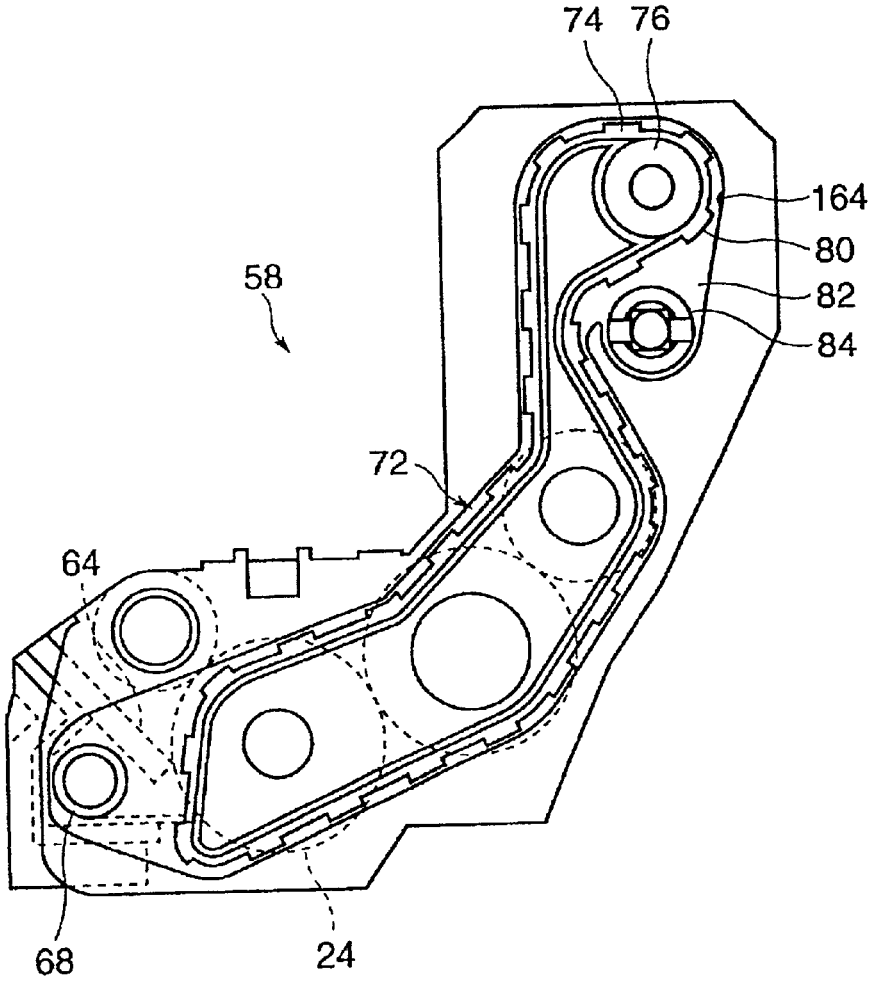
FIG. 28 is a side view showing a toner [recycling] *transporting* mechanism according to a ninth embodiment of the invention.

Next, a ninth embodiment will be described. Referring to FIG. 28, the ninth embodiment has the same configuration as the first embodiment, but with an additional projection 164 on the outer wall of the channel 72 just above the discharging station 80. This projection 164 interferes slightly with the belt conveyor 74, by brushing against the lateral ribs of the belt conveyor 74, for example, thereby causing vibrations that loosen toner from the belt conveyor 74, so that the toner does not adhere to the belt conveyor 74 but falls into the toner delivery chamber 82. By reducing the amount of toner that fails to be released at the discharging station 80, the ninth embodiment enables the toner [recycling] *transporting* mechanism to operate more efficiently.

Figure 29:
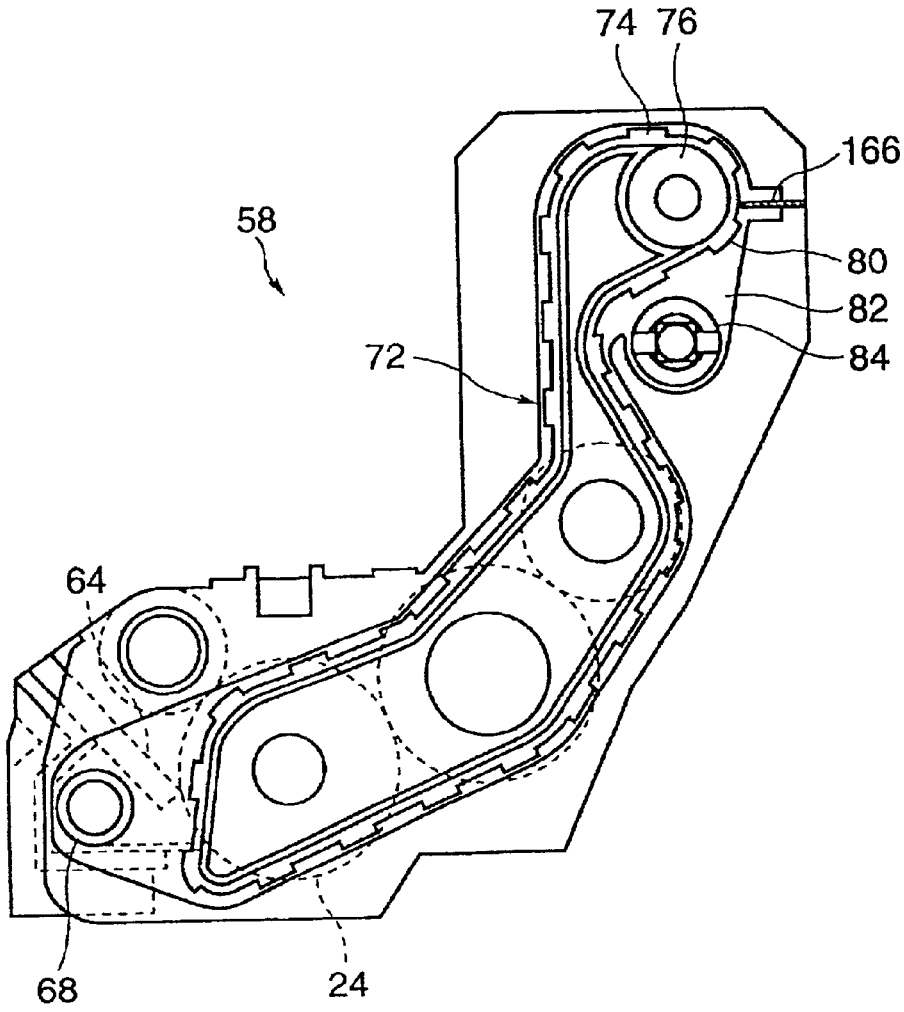
FIG. 29 is a side view showing a toner [recycling] *transporting* mechanism according to a tenth embodiment of the invention.

Next, a tenth embodiment will be described. Referring to FIG. 29, the tenth embodiment has the same configuration as the first embodiment, but with the addition of a flexible-blade 166 that extends into the channel 72 just above the discharging station 80. This flexible blade 166 serves the same purpose as the projection in the ninth embodiment, slightly interfering with the belt conveyor 74 and thereby causing vibrations that loosen toner from the belt conveyor 74, so that more of the toner falls into the toner delivery chamber 82 and less toner adheres to the belt conveyor 74.

The preceding embodiments can be combined in various ways not explicitly mentioned above. For example, the projection 164 of the ninth embodiment or the flexible blade 166 of the tenth embodiment, can be combined with any of the preceding embodiments.

All of the embodiments described above have the advantages mentioned in the first embodiment. The width of the printing process cartridge 58 is reduced because the belt conveyor 74 is disposed in a channel 72 that loops around the ends of the shafts of existing rollers in the printing process cartridge 58, without extending beyond the ends of these shafts. No worm gear is required, so the load on the driving motor is reduced, and motion irregularities are avoided. In addition, the number of parts in the toner [recycling] *transporting* mechanism is reduced, so the cost of the printing process cartridge 58 is reduced, including both the materials cost and the cost of assembly.

Those skilled in the art will recognize that other embodiments are possible within the scope claimed below.

What is claimed is:

1. A method of [recycling] *transporting* toner in an electrophotographic printer having a photosensitive drum on which a latent image is formed, a developing unit for developing the latent image by application of toner, and a transfer unit for transferring the developed image from the photosensitive drum to a printing medium, comprising the steps of:

removing toner from said photosensitive drum after transfer of said image to said printing medium;

collecting the toner thus removed in a toner collection chamber;

using a belt conveyor to transport the toner from said toner collection chamber to a toner delivery chamber;

[returning the toner from said toner delivery chamber to said developing unit;]

using an idle rotatable element turning on a shaft to move said belt conveyor, said rotatable element rotating in relation to said shaft; and allowing foreign matter that becomes caught between said idle rotatable element and said shaft to escape through a groove formed in one of an outer surface of said shaft and an inner surface of said idle rotatable element.

2. A method of [recycling] *transporting* toner in an electrophotographic printer having a photosensitive drum on which a latent image is formed, a developing unit for developing the latent image by application of toner, and a transfer unit for transferring the developed image from the photosensitive drum to a printing medium, comprising the steps of:

removing toner from said photosensitive drum after transfer of said image to said printing medium;

collecting the toner thus removed in a toner collection chamber;

using a belt conveyor to transport the toner from said toner collection chamber to a toner delivery chamber;

[returning the toner from said toner delivery chamber to said developing unit;]

driving said belt conveyor by rotating a toothed wheel engaging said belt conveyor; and allowing toner that is picked up by said toothed wheel from said belt conveyor to drop through a passage and return to said belt conveyor.

3. A method of [recycling] *transporting* toner in an electrophotographic printer having a photosensitive drum on which a latent image is formed, a developing unit for developing the latent image by application of toner, and a transfer unit for transferring the developed image from the photosensitive drum to a printing medium, comprising the steps of:

removing toner from said photosensitive drum after transfer to said image to said printing medium;

collecting the toner thus removed in a toner collection chamber;

using a belt conveyor to transport the toner from said toner collection chamber to a toner delivery chamber;

[returning the toner from said toner delivery chamber to said developing unit;]and driving a screw conveyor having a toothed end, said screw conveyor conveying said toner from one end of said toner delivery chamber toward a more central part of said toner delivery chamber, the toothed end of said screw conveyor simultaneously driving said belt conveyor.

4. A toner [recycling] *transporting* mechanism for an electrophotographic printer having a photosensitive drum on which a latent image is formed, a developing unit for developing said latent image by application of toner, and a transfer unit for transferring the developed image to a printing medium, comprising:

a toner [recycling] *transporting* portion, having a channel forming a loop, with a pick-up station at a first position in said loop and a discharging station at a second position in said loop;

a cleaning unit attached to said toner [recycling] *transporting* portion, for removing said toner from said photosensitive drum after transfer of said image to said printing medium, *said cleaning unit* having a toner collection chamber opening into said channel at said pick-up station for holding the toner thus removed, and a first conveyor for conveying the toner in said toner collection chamber to said pick-up station;

a toner delivery chamber attached to said toner [recycling] *transporting* portion, opening into said chamber at said discharging station; and a *second conveyor in the form of a* belt conveyor disposed in *and guided by* said channel, for conveying said toner from said pick-up station to said discharging station.

5. The toner [recycling] *transporting* mechanism of claim 4, wherein said photosensitive drum, said developing unit, and said toner [recycling] *transporting* portion form part of a changeable cartridge in said electrophotographic printer.

6. The toner [recycling] *transporting* mechanism of claim 4, further comprising a pulley disposed inside said loop, in contact with said belt conveyor for driving said belt conveyor.

7. The toner [recycling] *transporting* mechanism of claim 4, further comprising a toothed wheel disposed outside said loop, in contact with said belt conveyor, for driving said belt conveyor.

8. The toner [recycling] *transporting* mechanism of claim 7, wherein said toner [recycling] *transporting* portion has a passage disposed below said toothed wheel and communicating with said channel, for receiving toner that is picked up by said toothed wheel from said belt conveyor and then dropped, and returning said toner to said belt conveyor.

9. The toner [recycling] *transporting* mechanism of claim 4, [wherein said second conveyor is] *further comprising a third conveyor which is in the form of* a screw conveyor with teeth at one end, said teeth engaging and driving said [belt] *second* conveyor.

10. The toner [recycling] *transporting* mechanism of claim 4, wherein said belt conveyor has an outer surface with lateral ribs for carrying said toner.

11. The toner [recycling] *transporting* mechanism of claim 4, wherein said belt conveyor has an outer surface with depressed pockets for carrying said toner.

12. The toner [recycling] *transporting* mechanism of claim 4, wherein said belt conveyor has cut-out holes for carrying said toner.

13. The toner [recycling] *transporting* mechanism of claim 4, wherein said belt conveyor has an outer surface with teeth for carrying said toner.

14. The toner [recycling] *transporting* mechanism of claim 13, wherein said teeth are set at an angle toward a direction of travel of said belt conveyor.

15. The toner [recycling] *transporting* mechanism of claim 4, wherein said belt conveyor has a longitudinal rib, and said channel has a groove accommodating said longitudinal rib, thereby preventing said belt conveyor from being installed in an incorrect orientation in said channel.

16. The toner [recycling] *transporting* mechanism of claim 4, further comprising:

a shaft attached to said toner [recycling] *transporting* portion, having a grooved cylindrical surface; and an idle rotatable element mounted on said shaft, for moving said belt conveyor, said rotatable element rotating in relation to said shaft;

the grooved cylindrical surface of said shaft providing an escape route for foreign matter that becomes caught between said shaft and said idle rotatable element.

17. The toner [recycling] *transporting* mechanism of claim 16, wherein the grooved cylindrical surface of said shaft has at least one longitudinal wedge-shaped groove.

18. The toner [recycling] *transporting* mechanism of claim 16, wherein the grooved cylindrical surface of said shaft has a helical groove.

19. The toner [recycling] *transporting* mechanism of claim 16, wherein said idle rotatable element is an idle gear transmitting torque to said belt conveyor.

20. The toner [recycling] *transporting* mechanism of claim 4, further comprising:

a shaft attached to said toner [recycling] *transporting* portion; and an idle rotatable element mounted on said shaft, for moving said belt conveyor, said rotatable element rotating in relation to said shaft, said idle rotatable element having a grooved inner surface in contact with said shaft, the grooved inner surface of said idle rotatable element providing an escape route for foreign matter that becomes caught between said shaft and said idle rotatable element.

21. The toner [recycling] *transporting* mechanism of claim 20, wherein the grooved inner surface of said idle rotatable element has a helical groove.

22. The toner [recycling] *transporting* mechanism of claim 21, wherein said idle rotatable element is an idle gear transmitting torque to said belt conveyor.

23. The toner [recycling] *transporting* mechanism of claim 20, wherein said idle rotatable element is an idle gear transmitting torque to said belt conveyor.

24. The toner [recycling] *transporting* mechanism of claim 4, further comprising an interfering member making contact with said belt conveyor at said discharging station, thereby loosening said toner from said belt conveyor.

25. The toner [recycling] *transporting* mechanism of claim 24, wherein said interfering member comprises a projection in an outer wall of said channel.

26. The toner [recycling] *transporting* mechanism of claim 24, wherein said interfering member comprises a flexible blade attached to said toner [recycling] *transporting* portion and extending into said channel.

27. The toner [recycling] *transporting* mechanism of claim 4, wherein:

said developing unit has a roller turning on a shaft; and said toner [recycling] *transporting* portion forms a side frame supporting one end of said shaft.

28. The toner [recycling] *transporting* mechanism of claim 27, wherein said channel forms a loop around said one end of said shaft.

*29. The toner transporting mechanism of claim 4, wherein said toner transporting portion forms a side frame supporting one end of a shaft of said photosensitive drum.*

*30. The toner transporting mechanism of claim 29, wherein said channel forms a loop around said one end of said shaft.*

*31. A method of transporting toner in an electrophotographic printer having a photosensitive drum on which a latent image is formed, a developing unit for developing the latent image by application of toner, and a transfer unit for transferring the developed image from the photosensitive drum to a printing medium, comprising the steps of:*

*removing toner from said photosensitive drum after transfer of said image to said printing medium;*

*collecting the toner thus removed in a toner collection chamber; and*

*slidably guiding a belt conveyor along a channel connecting the tone collection chamber to a toner delivery chamber to transport toner from the toner collection chamber to the toner delivery chamber.*

*32. A toner transporting mechanism for an electrophotographic printer having a photosensitive drum on which a latent image is formed, a developing unit for developing said latent image by application of toner, and a transfer unit for transferring the developed image to a printing medium, comprising:*

*a toner transporting portion, having a channel with a pick-up station at a first position along said channel and a discharge station at a second position along said channel;*

*a cleaning unit attached to said toner transporting portion for removing said toner from said photosensitive drum after transfer of said image to said printing medium, a toner collection chamber opening into said channel at said pick-up station for holding the toner thus removed, and a first conveyor for conveying the toner in said toner collection chamber to said pick-up station;*

*a toner delivery chamber attached to said toner transporting portion, opening into said channel at said discharging station; and*

*a second conveyor in the form of a belt conveyor disposed in and slidably guided by said channel, for conveying said toner from said pick-up station to said discharging station.*

*33. The toner transporting mechanism of claim 32, wherein said photosensitive drum, said developing unit, and said toner transporting portion form part of a changeable cartridge in said electrophotographic printer.*

*34. The toner transporting mechanism of claim 32, further comprising a third conveyor which is in the form of a screw conveyor with teeth at one end, said teeth engaging and driving said second conveyor.*

*35. The toner transporting mechanism of claim 32, wherein said developing unit has a roller turning on a shaft; and*

*said toner transporting portion forms a side frame supporting one end of said shaft.*

*36. The toner transporting mechanism of claim 32, wherein said toner transporting portion forms a side frame supporting one end of a shaft of said photosensitive drum.*

*37. The toner transporting mechanism of claim 32, wherein said second conveyor has a surface with lateral ribs for carrying said toner.*

*38. The toner transporting mechanism of claim 32, wherein said second conveyor has a surface with depressed pockets for carrying said toner.*

*39. The toner transporting mechanism of claim 32, wherein said second conveyor has cut-out holes for carrying said toner.*

*40. The toner transporting mechanism of claim 32, wherein said second conveyor has a surface with teeth for carrying said toner.*

*41. The toner transporting mechanism of claim 40, wherein said teeth are set at an angle toward a direction of travel of said second conveyor.*

*42. The toner transporting mechanism of claim 32, wherein said channel is formed in a side frame.*

* * * * *